(12) United States Patent
Hunter

(10) Patent No.: US 10,719,006 B1
(45) Date of Patent: Jul. 21, 2020

(54) FIREARM FOR USE IN VIDEO RECORDING AND AUDIO RECORDING

(71) Applicant: Clavel Hunter, Bowie, MD (US)

(72) Inventor: Clavel Hunter, Bowie, MD (US)

( * ) Notice: Subject to any disclaimer, the term of this patent is extended or adjusted under 35 U.S.C. 154(b) by 0 days.

(21) Appl. No.: 15/293,017

(22) Filed: Oct. 13, 2016

Related U.S. Application Data

(60) Provisional application No. 62/243,130, filed on Oct. 18, 2015.

(51) Int. Cl.
| | | |
|---|---|---|
| *G03B 29/00* | (2006.01) | |
| *F41C 27/00* | (2006.01) | |
| *H04N 5/33* | (2006.01) | |
| *F41A 17/06* | (2006.01) | |

(52) U.S. Cl.
CPC .............. *G03B 29/00* (2013.01); *F41A 17/06* (2013.01); *F41C 27/00* (2013.01); *H04N 5/33* (2013.01)

(58) Field of Classification Search
None
See application file for complete search history.

(56) References Cited

U.S. PATENT DOCUMENTS

| | | | |
|---|---|---|---|
| 1,960,998 A | 5/1934 | Atkin | |
| 5,042,048 A * | 8/1991 | Meyer | G01S 17/89 250/492.1 |
| 2006/0082730 A1* | 4/2006 | Franks | G08B 13/19645 352/95 |
| 2011/0157388 A1* | 6/2011 | Liu | H04N 5/2251 348/222.1 |
| 2016/0373700 A1* | 12/2016 | Sandoval | G03B 29/00 |

* cited by examiner

*Primary Examiner* — William B Perkey

(57) ABSTRACT

An improved firearm for use in video recording and audio recording is a video and audio recording system for a firearm that becomes active when the safety is taken off. The recording system is unable to be manipulated by the user.

10 Claims, 3 Drawing Sheets

FIREARM FOR USE IN VIDEO RECORDING AND AUDIO RECORDING

CROSS-REFERENCE TO RELATED APPLICATION

The present application is related to and claims priority from prior provisional application Ser. No. 62/243,130, filed Oct. 18, 2015 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of firearm cameras and more specifically relates to an improved firearm for use in video recording and audio recording.

2. Description of the Related Art

There are over 900,000 police officers at work in America, and more than 250 million guns owned legally by citizens for hunting and for self defense. The amount of illegally owned guns or guns that are not on record is really unknown. It is reasonable to expect that at just about any time or place, a person would be within a relatively close distance of a firearm. In general, the vast majority of Americans are law abiding and do not use firearms in an illegal fashion, however, the unknown number of criminals or people that possess illegal firearms and have a propensity to use them illegally provides the unstable factor to society. In particular, this factor is perhaps the largest contributor as to why an officer may unholster his weapon. Self preservation dictates that when firearms are involved during a confrontation, that the individual who pulls the firearm first is most likely to survive. This fact is incorporated into the training of police officers. Police are trained to use their weapons only as a last resort but at the same time the need to be armed and ready first is a strong consideration.

In recent years however, there has been considerable controversy over whether police have used their weapons lawfully when a shooting has occurred. Many times, it has been proven that an officer acted criminally in the shooting of a suspect, and alternately, it has also been proven that a large number of witnesses have testified falsely when a shooting involving an officer and someone of an ethnic group has occurred because of racial motivations or the deep seeded resentment of racial injustice. Riots and contentions continue to occur because there is usually not definite proof one way or the other of the exact facts of an incident. A solution that would protect policemen and women, and the public in general, is needed to eliminate the problem.

Various attempts have been made to solve the above-mentioned problems such as those found in U.S. Publication No. 2006/0082730 to Ronald Franks; U.S. Publication No. 2011/0157388 to Ming-Yen Liu; and U.S. Pat. No. 1,960,998 to Owen W. Atkin et al. None of the above inventions and patents, taken either singly or in combination, is seen to describe the invention as claimed.

Ideally, a firearm cameras should provide direct recording of the event in question without the possibility of failure, and yet, would operate reliably and be manufactured at a modest expense. Thus, a need exists for a reliable improved firearm for use in video recording and audio recording to avoid the above-mentioned problems.

BRIEF SUMMARY OF THE INVENTION

In view of the foregoing disadvantages inherent in the known firearm camera art, the present invention provides a novel improved firearm for use in video recording and audio recording. The general purpose of the present invention, which will be described subsequently in greater detail, is to provide accurate video footage every time a firearm is used.

The improved firearm is designed to capture an audio and visual record anytime the firearm is used which can be downloaded or transmitted and reviewed at a later date. The improved firearm is designed to provide a digital electronic record for personnel such as police officers or people in other such professions where a record of facts of how the weapon was used in an event is needed. The video recording device within the firearm is adapted to record videos and/or to record still frame pictures in digital format.

The improved firearm for use in video recording and audio recording may comprise a main body portion, a barrel member connected to the main body portion that is adapted to allow munitions to pass therethrough, a gripping member connected to the main body member that is hollow and defines an interior volume, a video recording device that includes a camera lens and an infra-red emitter embedded within the distal end of the barrel member that is adapted to video record the use of the firearm in low and no light environments, an audio recording device embedded within a portion of the barrel member that is adapted to audio record the use of the firearm and is electronically connected to the video recording device via electrical wires, a computer device located within the interior volume of the gripping portion that is electronically connected to the video recording device and the audio recording device and is adapted to control and to retrieve, process, and send electronic information from the video recording device and the audio recording device to a designated location.

A safety switch member is electronically connected to the computer device and is adapted to turn on the video and audio recording device when the firearm is in use. Yellow, blue, and red led lights are embedded within the distal end of the barrel member that are electronically connected to the computer device that are adapted to be respectively activated individually to signal the state of use of the video recording device and the audio recording device. A power source is located within the interior volume of the gripping portion and is adapted to power the computer device, the video recording device, and the audio recording device when the safety is taken off. The power source, in a preferred embodiment, has rechargeable batteries that may be recharged via a power supply port embedded within a portion of the gripping member that is adapted to supply power from an outside power source to the rechargeable batteries for recharging.

A USB port may be embedded within a portion of the gripping member that is adapted to retrieve stored information, but may also be adapted to send the electronic information to and from the computer device in an external system.

The present invention holds significant improvements and serves as an improved firearm for use in video recording and audio recording. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, improved firearm for use in video recording and audio recording, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a firearm camera, and more particularly to an improved firearm for use in video recording and audio recording as used to improve the direct recording of the event in question without the possibility of failure.

Generally speaking, the improved firearm for use in video recording and audio recording is a video and audio recording system for a firearm that becomes active when the safety is taken off. The recording system is unable to be manipulated by the user.

Figure 1:
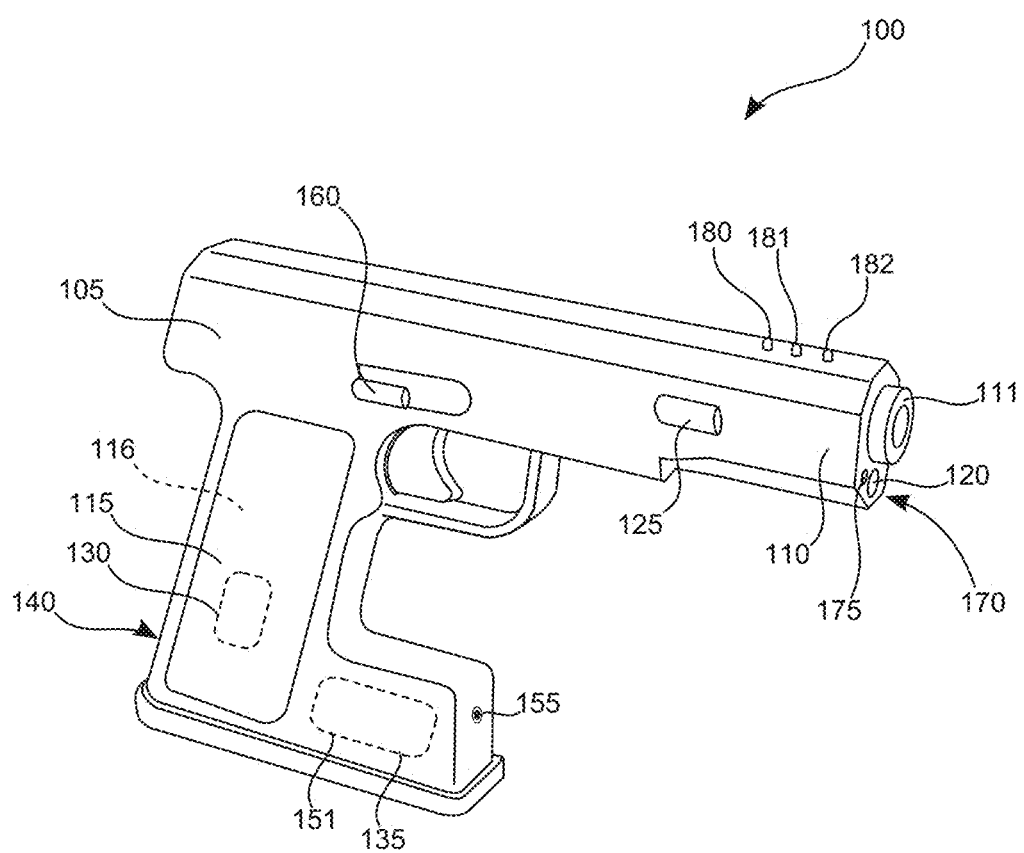
FIG. 1 shows a perspective view illustrating an improved firearm for use in video recording and audio recording according to an embodiment of the present invention.

Referring to the drawings by numerals of reference there is shown in FIG. 1, shows a perspective view illustrating improved firearm 100 according to an embodiment of the present invention.

Improved firearm 100 is designed to capture an audio and visual record anytime improved firearm 100 is used which can be downloaded or transmitted and reviewed at a later date. Improved firearm 100 is designed to provide a digital electronic record for personnel such as police officers or people in other such professions where a record of facts of how the weapon was used in an event is needed. Video recording device 120 within improved firearm 100 is adapted to record videos and/or to record still frame pictures in digital format.

Improved firearm 100 may comprise main body portion 105, barrel member 110 connected to main body portion 105 that is adapted to allow munitions to pass therethrough, gripping member 115 connected to main body portion 105 that is hollow and defines interior volume 116, video recording device 120 that includes camera lens 170 and infra-red emitter 175 embedded within distal end 111 of barrel member 110 that is adapted to video record the use of improved firearm 100 in low and no light environments, audio recording device 125 embedded within a portion of barrel member 110 that is adapted to audio record the use of improved firearm 100 and is electronically connected to video recording device 120 via electrical wires 165, computer device 130 located within interior volume 116 of gripping member 115 that is electronically connected to video recording device 120 and audio recording device 125 and is adapted to control and to retrieve, process, and send electronic information from video recording device 120 and audio recording device 125 to a designated location.

Figure 2:
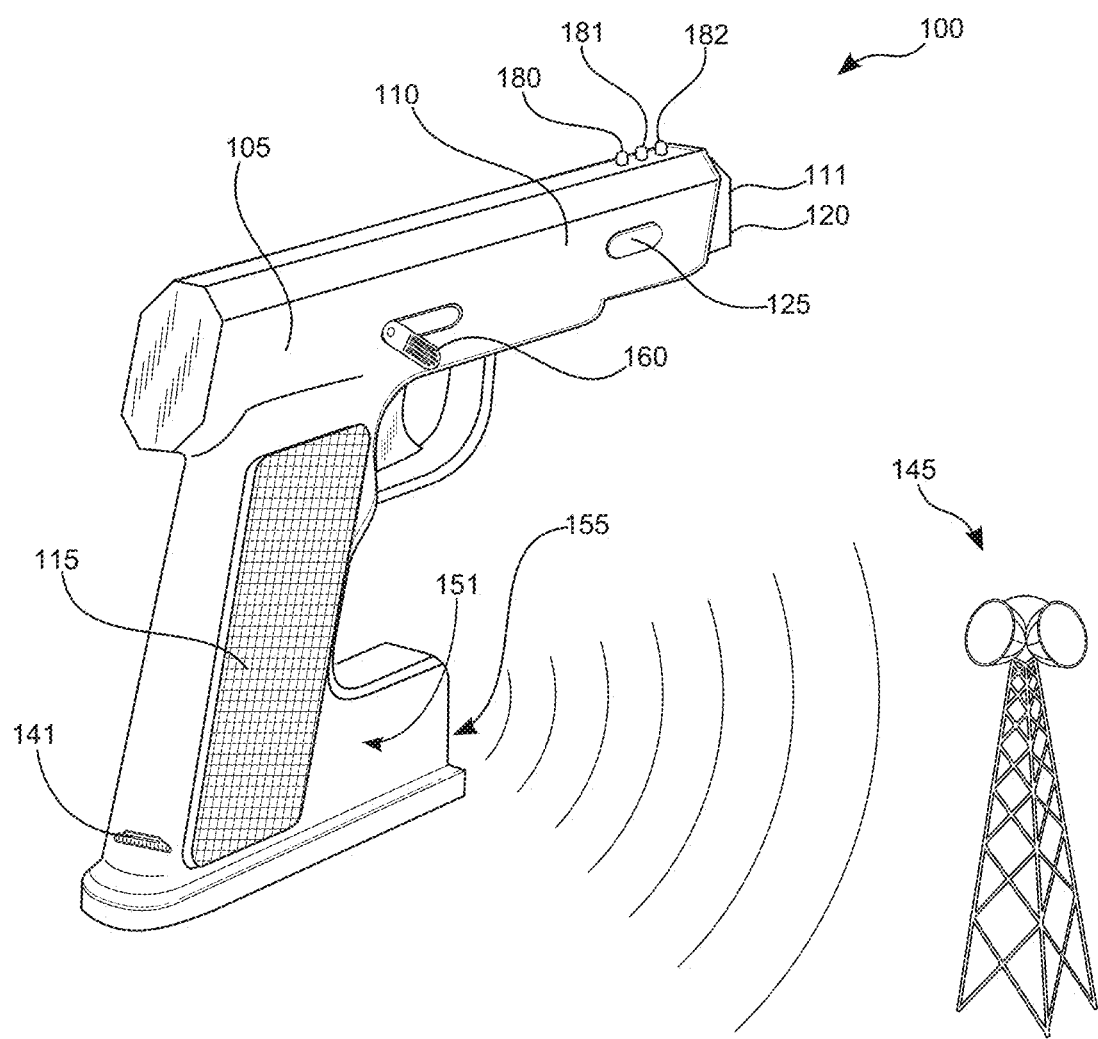
FIG. 2 is another perspective view illustrating a improved firearm for use in video recording and audio recording according to an embodiment of the present invention of FIG. 1.

Referring now to FIG. 2, is another perspective view illustrating improved firearm 100 according to an embodiment of the present invention of FIG. 1.

Safety switch member 160 is electronically connected to computer device 130 and is adapted to turn on video recording device 120 and audio recording device 125 when improved firearm 100 is in use. Yellow led 180, blue led 182, and red led 181 lights are embedded within distal end 111 of barrel member 110 that are electronically connected to computer device 130 that are adapted to be respectively activated individually to signal the state of use of video recording device 120 and audio recording device 125. Safety switch member 160 is not able to be taken off so that improved firearm 100 is ready to fire without video recording device 120 and audio recording device 125 being activated. Tampering with the features of improved firearm 100 may render improved firearm 100 inoperative since computer device 130 is able to control the functions. Improved firearm 100 is preferably shock proof and water proof for rugged use.

Figure 3:
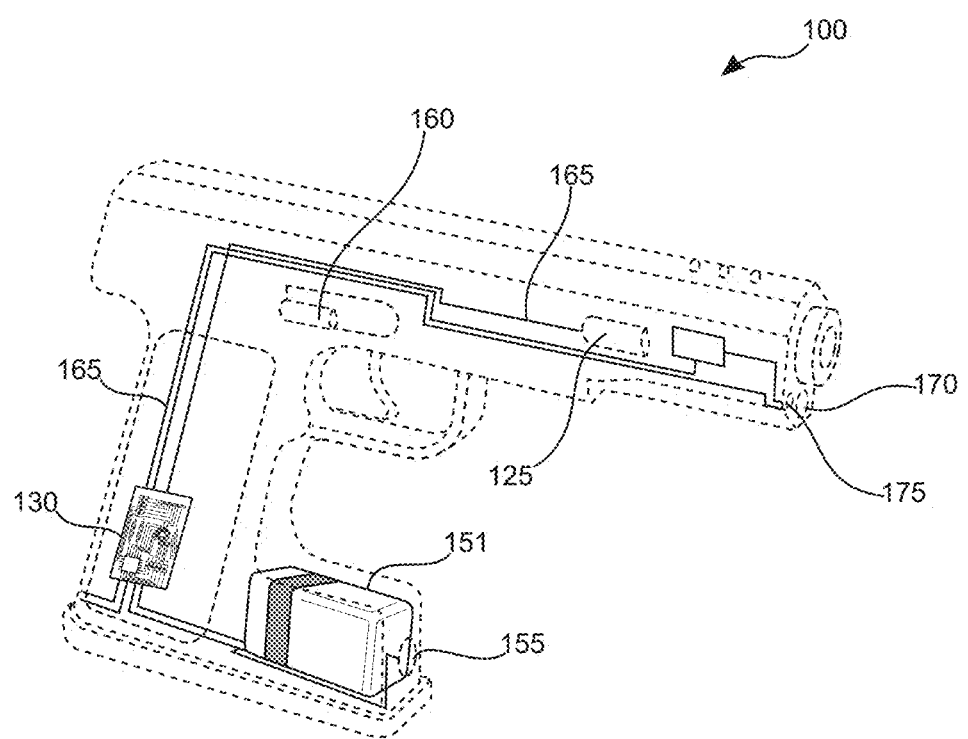
FIG. 3 is a see-through view illustrating improved firearm for use in video recording and audio recording according to an embodiment of the present invention of FIG. 1.

Referring now to FIG. 3, is a see-through view illustrating improved firearm 100 according to an embodiment of the present invention of FIG. 1.

Power source 150 is located within interior volume 116 of gripping member 115 and is adapted to power computer device 130, video recording device 120, and audio recording device 125 when the safety is taken off. Power source 150, in a preferred embodiment, has rechargeable batteries 151 that may be recharged via power supply port 155 embedded within a portion of gripping member 115 that is adapted to supply power from an outside power source to rechargeable batteries 151 for recharging.

USB port 141 may be embedded within a portion of gripping member 115 that is adapted to retrieve stored information, but may also be adapted to send the electronic information to and from computer device 130 in an external system.

Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An improved firearm for use in video recording and audio recording the use thereof, comprising:
    a main body portion; a barrel member;
    wherein said barrel member is connected to said main body member and is adapted to allow munitions to pass therethrough;
    a gripping member;
    wherein said gripping member is connected to said main body member; and wherein said gripping member is hollow and defines an interior volume;
    a video recording device; wherein said video recording device is embedded within a distal end of said barrel member and is adapted to video record the use of said firearm;
    an audio recording device;
    wherein said audio recording device is embedded within a portion of said barrel member and is adapted to audio record the use of said firearm;
    a computer device;
    wherein said computer device is located within said interior volume of said gripping portion, is electronically connected to said video recording device and said audio recording device, and is adapted to control and retrieve, process, and send electronic information from said video [recording device and said audio recording device; a power source;
    wherein said power source is located within said interior volume of said gripping portion and is adapted to power said computer device, said video recording device, and said audio recording device;
    wherein said improved firearm is adapted to have the use thereof recorded and said information retrieved and available for review[.]
    further comprising yellow, blue, and red LED lights embedded within said distal end of said barrel member, are electronically connected to said computer device, and are adapted to be respectively activated individually to signal the state of use of said video recording device and said audio recording device.

2. The improved firearm of claim 1, further comprising an electronic port embedded within a portion of said gripping member and adapted to send said electronic information to and from said computer device and an external system.

3. The improved firearm of claim 2, wherein said electronic port is formed as a USB port.

4. The improved firearm of claim 1, wherein said power source is formed from rechargeable batteries.

5. The improved firearm of claim 4, further comprising a power supply port embedded within a portion of said gripping member and adapted to send electricity to said rechargeable batteries.

6. The improved firearm of claim 1, further comprising a safety switch member electronically connected to said computer device and is adapted to turn on said video recording device and said audio recording device when said firearm is in use.

7. The improved firearm of claim 1, wherein said electronic information is in digital form.

8. The improved firearm of claim 1, wherein said video recording device is adapted to record videos and record still frame pictures.

9. The improved firearm of claim 1, wherein said is electronically connected to said video recording device and said audio recording device via electrical wires.

10. The improved firearm of claim 1, wherein said video recording device includes a camera lens and an infra-red emitter, and is adapted to record video in low and no light environments.

* * * * *